US 8,488,348 B2

(12) United States Patent
Hong et al.

(10) Patent No.: US 8,488,348 B2
(45) Date of Patent: Jul. 16, 2013

(54) SWITCH MODE POWER SUPPLY APPARATUS HAVING ACTIVE CLAMPING CIRCUIT

(75) Inventors: Hyung-won Hong, Gwacheon-si (KR); Joe-hoon Jung, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 457 days.

(21) Appl. No.: 11/971,406

(22) Filed: Jan. 9, 2008

(65) Prior Publication Data

US 2008/0315858 A1 Dec. 25, 2008

(30) Foreign Application Priority Data

Jun. 20, 2007 (KR) .................. 10-2007-0060683

(51) Int. Cl.
*H02H 7/122* (2006.01)
(52) U.S. Cl.
USPC .................. 363/56.12; 363/21.18
(58) Field of Classification Search
USPC .......... 363/21.12–21.18, 56.05, 56.08, 56.11, 363/56.12
See application file for complete search history.

(56) References Cited

U.S. PATENT DOCUMENTS 5,901,051 A * 5/1999 Takahashi et al. ......... 363/21.18
6,639,811 B2 * 10/2003 Hosotani et al. ............. 363/19
7,006,364 B2 * 2/2006 Jin et al. ..................... 363/21.01
2002/0067624 A1 * 6/2002 Nishiyama et al. ........ 363/21.01
2007/0115699 A1 * 5/2007 Yang .......................... 363/21.03

FOREIGN PATENT DOCUMENTS

| CN | 1351409 | 5/2002 |
|---|---|---|
| CN | 1405959 | 3/2003 |
| KR | 10-0503770 | 7/2005 |

OTHER PUBLICATIONS

Chinese Office Action for related Chinese Patent Application No. 200810081471.4, dated Apr. 1, 2012.
Korean Office Action for related Korean Patent Application No. 10-2008-0004440, dated May 23, 2012.
Chinese Office Action for related Chinese Patent Application No. 200810081471.4, mailed on Dec. 28, 2012.

* cited by examiner

*Primary Examiner* — Harry Behm
*Assistant Examiner* — Matthew Grubb
(74) *Attorney, Agent, or Firm* — Staas & Halsey LLP (57) ABSTRACT

A switch mode power supply apparatus includes a transformer, a main switching device to adjust a power supply supplied to a primary coil of the transformer, an active clamping circuit to suppress a voltage stress of the main switching device, and a control circuit to control a clamping operation of the active clamping circuit when the switch mode power supply apparatus is in a standby mode. Therewith, it is possible to significantly reduce power consumption of the switch mode power supply apparatus in the standby mode and improve efficiency of the switch mode power supply apparatus.

22 Claims, 6 Drawing Sheets

SWITCH MODE POWER SUPPLY APPARATUS HAVING ACTIVE CLAMPING CIRCUIT

CROSS-REFERENCE TO RELATED APPLICATION

This application claims the benefit of Korean Application No. 2007-60683, filed Jun. 20, 2007 in the Korean Intellectual Property Office, the disclosure of which is incorporated herein by reference.

BACKGROUND OF THE INVENTION

1. Field of the Invention

Aspects of the present invention relate to a switch mode power supply apparatus, and more particularly, to a switch mode power supply apparatus having an active clamping circuit which can suppress a voltage stress of a switching device to adjust a power supply supplied to a primary coil of a transformer of the switch mode power supply apparatus.

2. Description of the Related Art

In conventional switch mode power supply apparatuses, particularly, in flyback converters, forward converters, etc., when a switch operation is performed, a voltage spike is generated across a main switching device due to energy which is stored in a leakage inductor or magnetizing inductor of a transformer. Due to the voltage spike, power loss increases and an excessive voltage stress is applied to the main switching device. In order to suppress the voltage stress, an active clamping circuit to form a discharge path for the energy stored in the leakage inductor or magnetizing inductor is used. The active clamping circuit operates when the main switching device opens so as to prevent the main switching device from being damaged due to the energy stored in the leakage inductor or magnetizing inductor and reuse the energy, thereby improving power conversion efficiency. Also, by using the active clamping circuit, zero-voltage switching between the main switching device and a clamping switching device of the active clamping circuit is possible. Accordingly, switching loss is reduced, thus increasing efficiency, and the amount of heating upon switching is reduced.

However, when an active clamping circuit is used in a standby mode in which power consumption of the switch mode power supply apparatus becomes very low, power loss increases due to copper loss or load loss of a transformer of the switch mode power supply apparatus. The copper loss is caused by a circulating current of a primary side of the transformer, which is generated by a clamping operation, and the reduction of power consumption of the switch mode power supply apparatus in the standby mode is limited. Also, due to the clamping operation of the active clamping circuit, since the switch mode power supply apparatus operates only in a continuous conduction mode (CCM), it is difficult to enter a burst mode or a skip cycle mode in which switching loss can be reduced, and accordingly power loss further increases in the standby mode.

SUMMARY OF THE INVENTION

Aspects of the present invention provide a switch mode power supply apparatus having an active clamping circuit which can minimize power consumption in a standby mode to improve efficiency.

According to an aspect of the present invention, there is provided a switch mode power supply apparatus comprising: a transformer having a primary coil connected to a source and a secondary coil connected to an output circuit; a main switching device to adjust a power supply supplied from the source to the primary coil of the transformer; an active clamping circuit to suppress a voltage stress of the main switching device; and a control circuit to disable a clamping operation of the active clamping circuit when the switch mode power supply apparatus is in a standby mode.

According to an aspect of the current invention, the active clamping circuit may comprise a first switching device and a clamping capacitor to perform the clamping operation.

According to an aspect of the current invention, the first switching device may be a Metal Oxide Semiconductor Field Effect Transistor (MOSFET), and a control signal from the control circuit is input to a gate of the MOSFET device to control a switching operation of the first switching device to perform the clamping operation, and a second switching device may be connected to the gate of the MOSFET device, and the control circuit disables the clamping operation by turning off the second switching device in the standby mode.

According to an aspect of the current invention, the active clamping circuit may comprise an auxiliary coil coupled to the primary coil of the transformer, and the control signal to control the switching operation of the MOSFET device is generated by the auxiliary coil.

According to an aspect of the current invention, the switch mode power supply apparatus may further comprise a Pulse Width Modulation (PWM) control unit to generate a control signal to control a switch operation of the main switching device and a control signal to control a switch operation of the MOSFET device.

According to an aspect of the current invention, the active clamping circuit may further comprise a dead-time control circuit connected to the gate of the MOSFET device.

According to an aspect of the current invention, the active clamping circuit further comprises a pulse transformer disposed between the PWM controller and the gate of the MOSFET device.

According to an aspect of the current invention, the active clamping circuit may further comprise a bootstrap circuit connected to the gate of the MOSFET device.

According to an aspect of the current invention, the control circuit may generate a control signal to disable the clamping operation of the active clamping circuit according to an output voltage of the output circuit connected to the secondary coil of the transformer. The control circuit may compare the output voltage with a predetermined reference voltage and generate the control signal to disable the clamping operation of the active clamping circuit according to the comparison result.

According to an aspect of the current invention, the control circuit may generate the control signal to disable the clamping operation of the active clamping circuit, according to a current flowing through the main switching device. The control circuit may compare a voltage across a resistor connected to the switching device with a predetermined reference voltage and generate the control signal to disable the clamping operation of the active clamping circuit according to the comparison result.

According to an aspect of the current invention, the control circuit may generate the control signal for disabling the operation of the active clamping circuit, according to a signal generated by an external device installed outside the switch mode power supply apparatus, the external device indicating whether the switch mode power supply apparatus is in the standby mode.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1:
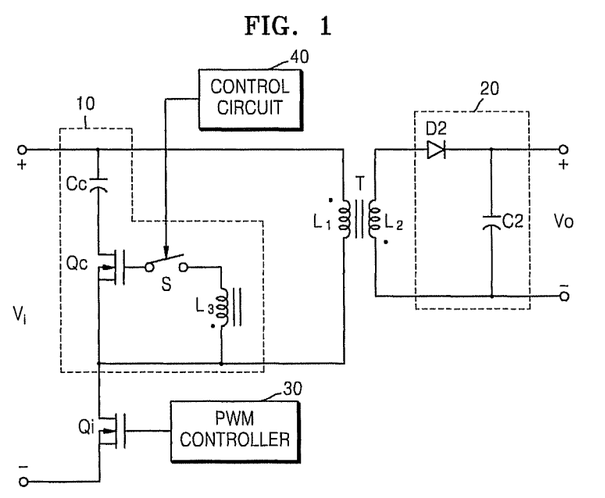
FIG. 1 is a circuit diagram of a switch mode power supply apparatus according to an embodiment of the present invention.

FIG. 1 is a circuit diagram of a switch mode power supply apparatus according to an embodiment of the present invention. Although, the switch mode power supply apparatus according to the current embodiment is shown as having a single output, it is understood that aspects of the present invention can be implemented to output N supply voltages in which N is a natural number. Further, if the number of outputs is N, a transformer can have N secondary coils, and each secondary coil can be connected to one of or a number of a plurality of secondary output circuits.

Referring to FIG. 1, the switch mode power supply apparatus includes a transformer T having a primary coil $L_1$ and a secondary coil $L_2$, which has a predetermined turn ratio with respect to the primary coil $L_1$. The primary coil $L_1$ is connected to a primary circuit, and the secondary coil $L_2$ is connected to an output circuit. Here, the primary circuit is insulated from the output circuit by the transformer T.

The primary circuit includes a main switching device Qi, a Pulse Width Modulation (PWM) controller 30 to control the main switching device Qi by generating a PWM signal as a switching control signal, an active clamping circuit 10 to perform a clamping operation to suppress a voltage stress of the main switching device Qi. The active clamping circuit 10 may be a self-driven type active clamping circuit.

The main switching device Qi performs a switching operation in response to a switching control signal supplied by the PWM controller 30, thereby controlling the transformer T to charge or transfer energy. Meanwhile, the PWM controller 30 can control the switching operation of the main switching device Qi by using an output voltage of the output circuit.

The output circuit includes a rectifier 20 to rectify a supply voltage transferred to the secondary coil $L_2$ of the transformer T. In the current embodiment, the rectifier 20 may be a half-wave rectifier circuit including a diode D2 and a capacitor C2. However, the aspects of the present invention are not limited thereto, and the rectifier 20 can be any type of rectifier circuit. Also, output terminals to output voltages can be formed at both terminals of the capacitor C2.

The active clamping circuit 10 includes an auxiliary coil $L_3$, which is coupled with the primary coil $L_1$, a first switching device Qc, and a clamping capacitor Cc, in order to perform a clamping operation. The active clamping circuit 10 further includes a second switching device S to enable or disable the clamping operation. The first switching device Qc may be a Metal Oxide Semiconductor Field Effect Transistor (MOSFET) as illustrated in FIG. 1, and a gate terminal of the first switching Qc may include a driving circuit to drive the first switching device Qc.

The auxiliary coil $L_3$, which is coupled with the primary coil $L_1$, generates a first control signal for turning on or off the first switching device Qc, and the first control signal is input to the gate of the first switching device Qc. While an input voltage Vi is applied to the primary coil $L_1$ by turning on the main switching device Qi, the first switching device Qc is turned off according to the first control signal. If the main switching device Qi is turned off, and the first switching device Qc is turned on according to the first control signal, the active clamping circuit 10 operates to discharge energy accumulated in the transformer T and simultaneously clamp a voltage stress of the main switching device Qc to a sum value of the input voltage V1 and a voltage at both terminals of the clamping capacitor Cc. The clamping operation of the active clamping circuit 10 is performed while the second switching device S is turned on.

The control circuit 40 turns on the second switching device S when the switch mode power supply apparatus is in a normal operating mode, and turns off the second switching device S when the switch mode power supply apparatus is in a standby mode. Therefore, the control circuit 40 enables the clamping operation of the active clamping circuit 10 in the normal operating mode, and disables the clamping operation of the active clamping circuit 10 in the standby mode. The second switching device S can be implemented using a photocoupler, a Bipolar Junction Transistor (BJT), a MOSFET, or the like. If the second switching device S is implemented using a photocoupler, the control circuit 40 may includes a photodiode and the second switching device S may be a phototransistor.

Here, the standby mode minimizes power consumption, and can be set when a very small load is applied to the output terminals of the output circuit, or when a control signal is received from a control apparatus, such as a micom, which is installed outside the switch mode power supply apparatus.

Figure 2:
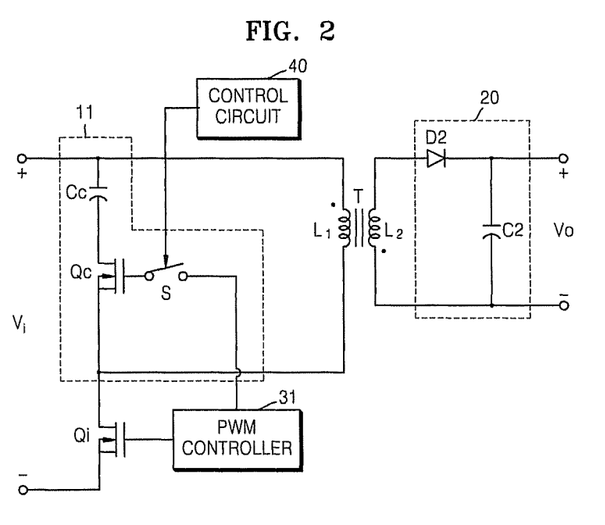
FIG. 2 is a circuit diagram of a switch mode power supply apparatus according to another embodiment of the present invention.

FIG. 2 is a circuit diagram of a switch mode power supply apparatus according to another embodiment of the present invention. In the current embodiment, an external-driven type active clamp circuit is used. Like the switch mode power supply apparatus illustrated in FIG. 1, although the switch mode power supply apparatus according to FIG. 2 includes a single output, it is understood that the switch mode power supply apparatus according to aspects of the present invention can be implemented to output N supply voltages.

However, unlike the switch mode power supply apparatus illustrated in FIG. 1, in the switch mode power supply apparatus according to the current embodiment, the clamping operation of an active clamping circuit 11 is performed according to a second control signal from a PWM controller 31. The operation of the switch mode power supply apparatus according to the current embodiment is substantially similar to that of the switch mode power supply apparatus illustrated in FIG. 1.

The PWM controller 31 generates a first or switching control signal to control the switching operation of a main switching device Qi, and a second control signal to control the switching operation of a first switching device Qc. The main switching device Qi is turned on or off in response to the switching control signal supplied from the PWM controller 31, thereby allowing a transformer T to charge or transfer energy. Meanwhile, the PWM controller 31 can control the switching operation of the main switching device Qi using an output voltage of an output circuit.

The active clamping circuit 11 includes the first switching device Qc and a clamping capacitor Cc to perform a clamping operation, and a second switching device S to enable or disable the clamping operation, as in the switch mode power supply apparatus illustrated in FIG. 1. The first switching device Qc, as illustrated in FIG. 2, may be a MOSFET, and can include a driving circuit (not illustrated in FIG. 2) which is connected to the gate of the first switching device Qc and drives the first switching terminal Qc.

The PWM controller 31 applies the switching control signal and the second control signal to the main switching device Qi and the first switching device Qc, respectively, so that the main switching device Qi and the first switching device Qc are driven in a manner to be complementary to each other. For example, the PWM controller 31 applies a second control signal for turning on the first switching device Qc to the first switching device Qc, if the switching control signal indicates tuning off of the main switching device Qi, and applies a second control signal for turning off the first switching device Qc to the first switching device Qc, if the switching control signal indicates turning on of the main switching device Qi. Accordingly, while an input voltage is applied to a primary coil $L_1$ due to the turning on of the main switching device Qi, the first switching device is turned off. If the main switching device Qi is turned off and the first switching device Qc is turned on, the active clamping circuit 11 operates to discharge energy accumulated in the transformer T and simultaneously clamp a voltage stress of the main switching device Qc to a sum value of an input voltage V1 and a voltage at both terminals of the clamping capacitor Cc. Like the switch mode power supply apparatus illustrated in FIG. 1, the clamping operation of the active clamping circuit 11 is performed while the second switching device S is turned on.

Figure 3:
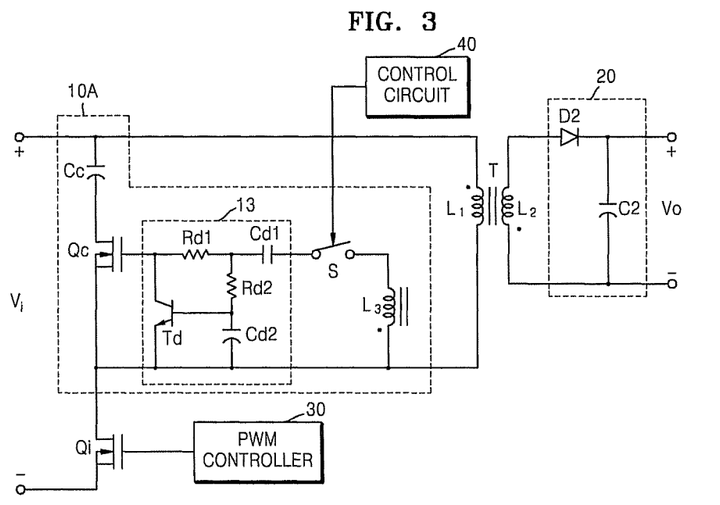
FIG. 3 is a circuit diagram of a switch mode power supply apparatus in which a dead-time control circuit is added to an active clamping circuit of the switch mode power supply apparatus illustrated in FIG. 1, according to another embodiment of the present invention.

FIG. 3 is a circuit diagram of a switch mode power supply apparatus in which a dead-time control circuit 13 is added to the active clamping circuit 10A of the switch mode power supply apparatus illustrated in FIG. 1, according to another embodiment of the present invention. Referring to FIG. 3, the dead-time control circuit 13 is connected to the gate of the first switching device Qc.

A dead time required to turn on a switching device when the other switching device is completely turned off decreases switching loss and a voltage stress that occur in a period in which a main switching device Qi and a first switching device Qc are simultaneously turned on. The dead time control circuit 13 controls such a dead time and includes a bipolar junction transistor (BJT) Td, resistors Rd1 and Rd2, and capacitors Cd1 and Cd2. Although the BJT Td is illustrated as an NPN BJT, it is understood that the BJT Td is not limited thereto. As illustrated in FIG. 3, a collector of the BJT Td is connected to the gate of the first switching device Qc and the resistor Rd1 while the emitter is connected to the primary coil $L_1$ of the transistor T. A base of the BJT Td is connected between the resistor Rd2 and the capacitor Cd2. The resistor Rd2 is further connected between the resistor Rd1 and the capacitor Cd1, which is connected to the second switching device S.

Figure 4:
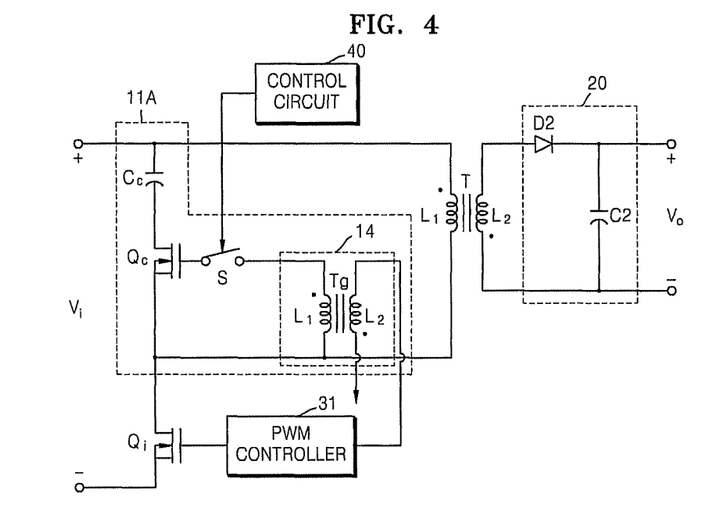
FIG. 4 is a circuit diagram of a switch mode power supply apparatus in which a pulse transformer is added to an active clamping circuit of the switch mode power supply apparatus illustrated in FIG. 2, according to another embodiment of the present invention.

FIG. 4 is a circuit diagram of a switch mode power supply apparatus in which a pulse transformer is added to an active clamping circuit of the switch mode power supply apparatus illustrated in FIG. 2, according to another embodiment of the present invention. Referring to FIG. 4, an active clamping circuit 11A of the switch mode power supply apparatus according to the current embodiment of the present invention includes a pulse transformer 14 which is connected to an input terminal to receive a control signal from a PWM controller 31. The pulse transformer 14 receives a control signal from the PWM controller 31, converts the control signal into a voltage capable of driving a first switching device Qc, and insulates the PWM controller 31 from the first switching device Qc.

Figure 5:
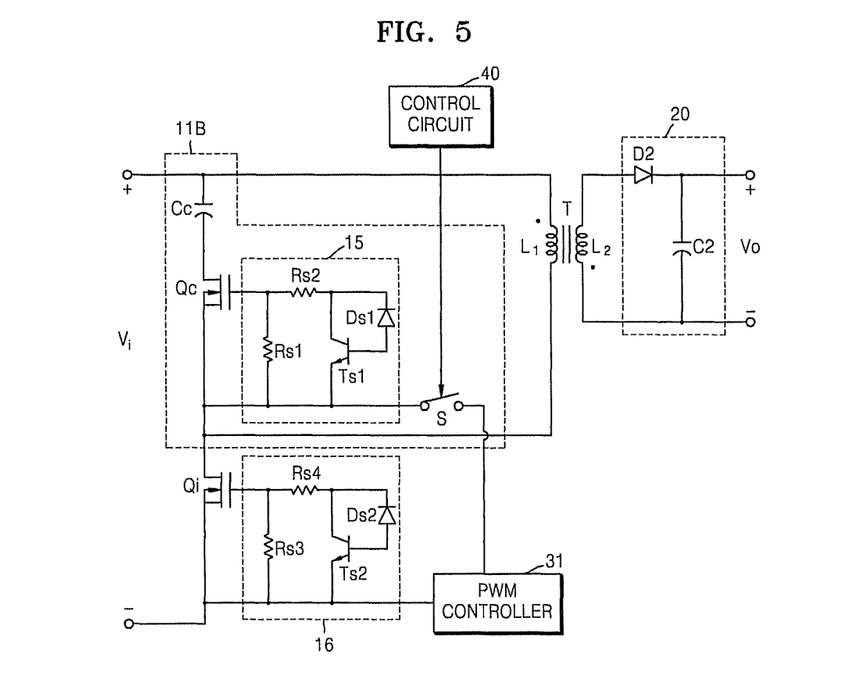
FIG. 5 is a circuit diagram of a switch mode power supply apparatus in which bootstrap circuits are added to a gate of a main switching device and the active clamping circuit of the switch mode power supply apparatus illustrated in FIG. 2, according to another embodiment of the present invention.

FIG. 5 is a circuit diagram of a switch mode power supply apparatus in which bootstrap circuits 15 and 16 are added to the gate of the main switching device Qi and the active clamping circuit 11B of the switch mode power supply apparatus illustrated in FIG. 2, according to another embodiment of the present invention. By adding the bootstrap circuit 15 to the gate of a first switching device Qc, a switching operation can be more stably performed.

Figure 6:
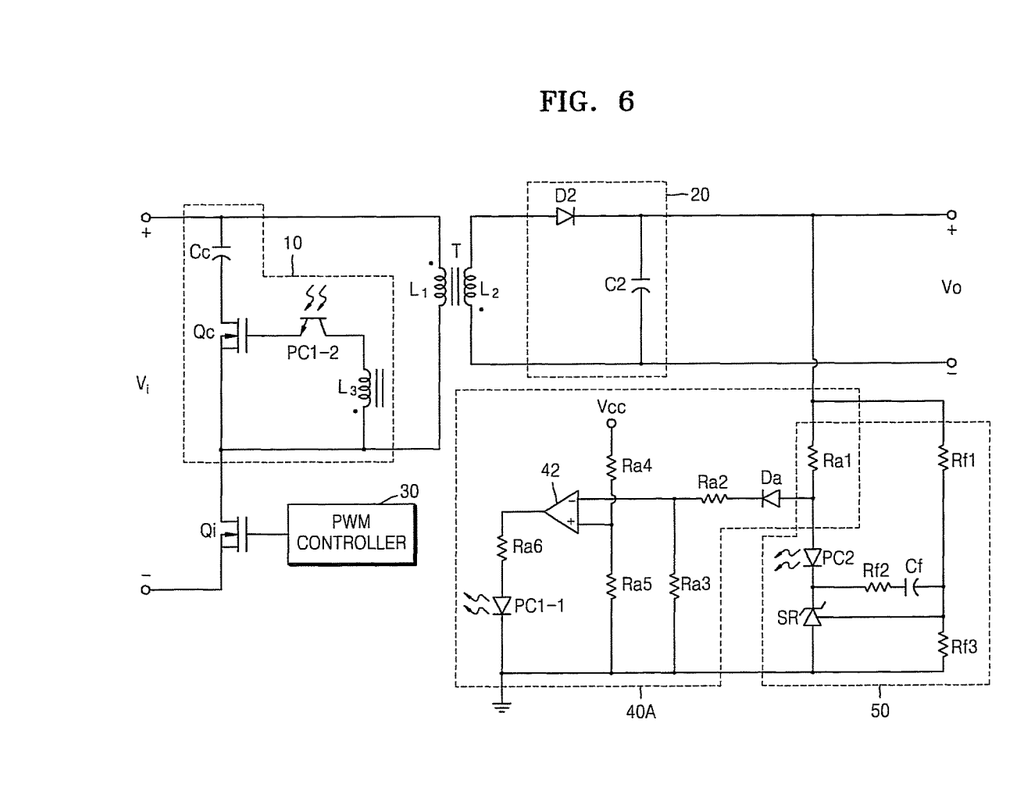
FIG. 6 is a circuit diagram of a switch mode power supply apparatus including a control circuit, according to an embodiment of the present invention.

FIG. 6 is a circuit diagram of a switch mode power supply apparatus including a control circuit 40A according to an embodiment of the present invention. Referring to FIG. 6, the switch mode power supply apparatus according to the current embodiment of the present invention includes an active clamping circuit 10 which is the same as the active clamping circuit 10 illustrated in FIG. 1. However, aspects of the present invention are not limited thereto, and one of the active clamping circuits 11, 10A, 11A and 11B included in the switch mode power supply apparatuses illustrated in FIGS. 2 through 5, respectively, can also be used in the switch mode power supply apparatus of FIG. 6.

The control circuit 40A generates a control signal for enabling or disabling the clamping operation of the active clamping circuit 10, according to an output voltage of an output circuit of the switch mode power supply apparatus. As described above, when a very small load is applied to an output terminal of the output circuit, the switch mode power supply apparatus enters a standby mode.

The less a load applied to the output terminals of the output circuit becomes, the higher the control circuit 40A output voltage becomes. In the current embodiment, the control circuit 40A disables the operation of the active clamping circuit 10 when the output voltage of the control circuit 40A exceeds a predetermined voltage.

The control circuit 40A includes a resistor Ra1 having a first terminal connected to an output terminal of the output circuit, a diode Da having an anode connected to a second terminal of the resistor Ra1, a resistor Ra2 having a first terminal connected to the cathode of the diode Da, a resistor Ra3 connected between a second terminal of the resistor Ra2 and a ground, a resistor Ra4 having a first terminal connected to a supply voltage source Vcc, a resistor Ra5 connected between a second terminal of the resistor Ra4 and the ground, a comparator 42 whose negative (−) terminal is connected to the second terminal of the resistor Ra2 and whose positive (+) terminal is connected to a first terminal of the resistor Ra5, a resistor Ra6 having a first terminal connected to an output terminal of the comparator 42, and a photodiode PC1-1 whose anode is connected to a second terminal of the resistor Ra6 and whose cathode is connected to the ground.

Details of the operation of the control circuit 40A will be described below. In the current embodiment, the second switching device S, as described with FIG. 1, is implemented using a photocoupler comprising the photodiode PC1-1 and the phototransistor PC1-2. An output voltage is detected with a predetermined ratio by the resistors Ra1, Ra2, and Ra3, and provided to the negative (−) terminal of the comparator 42. The diode Da prevents a current from flowing from the comparator 42 to the output terminal of the output circuit. The supply voltage Vcc is divided by the resistors Ra4 and Ra5 so that a predetermined reference voltage is applied to the positive (+) terminal of the comparator 42. If the output voltage detected with the predetermined ratio is lower than the predetermined reference voltage, a current flows to the photodiode PC1-1 and the resistor Ra6 connected to the output terminal of the comparator 42, so that the photodiode PC1-1 emits light and the phototransistor PC1-2 is turned on. However, if the output voltage detected with the predetermined ratio is higher than the predetermined reference voltage, no current flows to the output terminal of the comparator 42, so that the photodiode PC1-1 emits no light and the phototransistor PC1-2 is turned off. Accordingly, if the output voltage exceeds the predetermined reference voltage, the phototransistor PC1-2 is turned off and thus the clamping operation of the active clamping circuit 10 is disabled.

The switch mode power supply apparatus according to the current embodiment of the present invention includes an output voltage feedback circuit 50 which feeds back information about the output voltage to the PWM controller 30. The output voltage feedback circuit 50 includes a resistor Ra1 having a first terminal connected to an output terminal of the output circuit, a photodiode PC2 having an anode connected to a second terminal of the resistor Ra1, a shunt regulator SR having a cathode connected to the cathode of the photodiode PC2 and an anode connected to a ground, a resistor Rf1 connected between an output terminal of the output circuit and a reference terminal of the shunt regulator SR, a resistor Rf3 connected between the reference terminal of the shunt regulator SR and the ground, a resistor Rf2 connected in series between the cathode of the photodiode PC2 and a first terminal of the resistor Rf3, and a capacitor Cf. The photodiode PC2 outputs a signal corresponding to information about an output voltage, to the control circuit 40A through the phototransistor PC1-2, which is coupled with the photodiode PC2.

Figure 7:
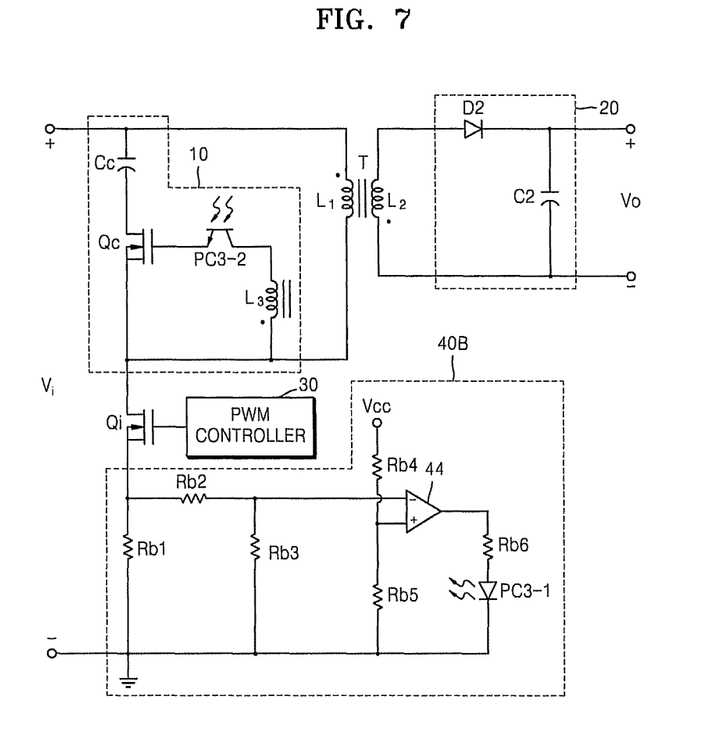
FIG. 7 is a circuit diagram of a switch mode power supply apparatus including a control circuit, according to another embodiment of the present invention.

FIG. 7 is a circuit diagram of a switch mode power supply apparatus including a control circuit 40B, according to another embodiment of the present invention. The switch mode power supply apparatus according to the current embodiment of the present invention includes an active clamping circuit 10 which is the same as the active clamping circuit 10 of the switch mode power supply apparatus illustrated in FIG. 1. However, aspects of the present invention are not limited thereto, and one of the active clamping circuits 11, 10A, 11A and 11B included in the switch mode power supply apparatuses illustrated in FIGS. 2 through 5, respectively, can also be used in the switch mode power supply apparatus of FIG. 7.

The control circuit 40B generates a control signal to enable or disable the clamping operation of the active clamping circuit 10, according to a current which flows through a primary circuit, that is, according to a current which flows through a main switching device Qi of the switch mode power supply apparatus. When the switch mode power supply apparatus is in a standby mode, a current which flows through the primary circuit becomes very small. Accordingly, in order to sense a current which flows through the main switching device Qi between the main switching device Qi and a ground, a resistor Rb1 is provided. Here, the less the current flowing through the main switching device Qi becomes, the less a voltage applied across the resistor Rb1 becomes. In the current embodiment, the operation of the active clamping circuit 10 is disabled when a voltage across the resistor Rb1 is lower than a predetermined voltage.

The control circuit 40B includes a resistor Rb1 having a first terminal connected to the main switching device Qi and a second terminal connected to a ground, a resistor Rb2 having a first terminal connected to the first terminal of the resistor Rb1, a resistor Rb3 connected between a second terminal of the resistor Rb2 and the ground, a resistor Rb4 having a first terminal connected to a supply voltage source Vcc, a resistor Rb5 connected between a second terminal of the resistor Rb4 and the ground, a comparator 44 whose negative (−) terminal is connected to the second terminal of the resistor Rb2 and whose positive (+) terminal is connected to a second terminal of the resistor Rb4 and a first terminal of the resistor Rb5, a resistor Rb6 having a first terminal connected to an output terminal of the comparator 42, and a photodiode PC3-1 whose anode is connected to a second terminal of the resistor Rb6 and whose cathode is connected to the ground.

Details of the operation of the control circuit 40B will be described below. In the current embodiment, the second switching device S, as described with FIG. 1, is implemented using a photocoupler comprising the photodiode PC3-1 and a phototransistor PC3-2.

A voltage across the resistor Rb1 is detected with a predetermined ratio by the resistors Rb2 and Rb3 and provided to the positive (+) terminal of the comparator 44. The supply voltage Vcc is divided by the resistors Rb4 and Rb5 so that a predetermined reference voltage is provided to the negative (−) terminal of the comparator 44. If the voltage across the resistor Rb1, which is detected with a predetermined ratio, is higher than the predetermined reference voltage, a current flows through the photodiode PC3-1 and the resistor Rb6 connected to the output terminal of the comparator 44, so that the photodiode PC3-1 emits light and the phototransistor PC3-2 is turned on. However, if the voltage across the resistor Rb1 is lower than the predetermined reference voltage, no current flows through the output terminal of the comparator 44, so that the photodiode PC3-1 emits no light and the phototransistor PC3-2 is turned off. Accordingly, if the voltage across the resistor Rb1 is lower than the predetermined voltage, that is, if a value of a current flowing through the main switching device Qi is less than a predetermined current value, the phototransistor PC3-2 is turned off and the clamping operation of the active clamping circuit 10 is disabled.

Figure 8:
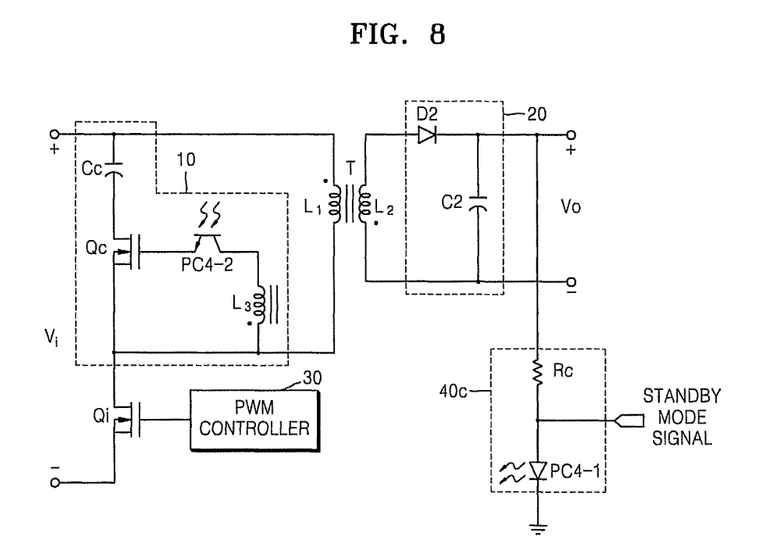
FIG. 8 is a circuit diagram of a switch mode power supply apparatus including a control circuit, according to another embodiment of the present invention.

FIG. 8 is a circuit diagram of a switch mode power supply apparatus including a control circuit 40C, according to another embodiment of the present invention. Referring to FIG. 8, the switch mode power supply according to the current embodiment of the present invention includes an active clamping circuit 10 which is the same as the active clamping circuit 10 illustrated in FIG. 1. However, aspects of the present invention are not limited thereto, and one of the active clamping circuits 11, 10A, 11A and 11B included in the switch mode power supply apparatuses illustrated in the FIGS. 2 through 5, respectively, can also be used in the switch mode power supply apparatus of FIG. 8.

The control circuit 40C generates a control signal to enable or disable the clamping operation of the active clamping circuit 10, according to a control signal which is received from a control apparatus (not shown), such as a micom, which is installed outside the switch mode power supply apparatus.

A standby mode signal is generated by the control apparatus which is installed outside the switch mode power supply apparatus, and indicates whether the switch mode power supply apparatus is in a standby mode. For example, if the standby mode signal is in a "high" state, it indicates a normal operating mode, and if the standby mode signal is in a "low" state, it indicates a standby mode.

The control circuit 40C includes a resistor Rc having a first terminal connected to an output terminal of an output circuit of the switch mode power supply apparatus and a second terminal connected to a standby mode signal output terminal of the control apparatus, and a photodiode PC4-1 having an anode connected to the second terminal of the resistor Rc and a cathode connected to a ground.

Details of the operation of the control circuit 40C will be described below. In the current embodiment, a second switching device S, as described with FIG. 1, is implemented using a photo coupler comprising a photodiode PC4-1 and a phototransistor PC4-2. If a standby mode signal is in a "high" state indicating a normal operating mode, a current flows through the photodiode PC4-1, so that the photodiode PC4-1 emits light and the phototransistor PC4-2 is turned on. However, if the standby mode signal is in a "low" state indicating a standby mode, no current flows through the photodiode PC4-1, so that the photodiode PC4-1 emits no light and thus the phototransistor PC4-2 is turned off. Accordingly, if a standby mode signal received by the control apparatus which is installed outside the switch mode power supply apparatus indicates a standby mode, the phototransistor PC4-2 is turned off and thus the clamping operation of the active clamping circuit 10 is disabled.

As described above, when the switch mode power supply apparatus according to aspects of the present invention is in a standby mode, the clamping operation of an active clamping circuit of the switch mode power supply apparatus is not performed. Accordingly, in the standby mode, a circulating path of a current is not formed in the primary circuit when the main switching device is turned off, and thus a power loss of a transformer, etc., which is caused by such current flow, is significantly reduced. Also, since the clamping operation of the active clamping circuit is not performed in the standby mode, the switch mode power supply apparatus can operate in a discontinuous conduction mode (DCM). Accordingly, it is possible to enter a burst mode or a skip cycle mode capable of reducing switching loss when a load of the output terminal is very small, and thus significantly reduce power consumption. Meanwhile, since a current flowing through the primary circuit is very small in the standby mode, energy stored in the leakage inductor or magnetizing inductor of the transformer is very small, and accordingly, a voltage spike generated across the main switching device is significantly reduced. Therefore, although the clamping operation of the active clamping circuit is not performed in the standby mode, the voltage stress of the switching device can be decreased.

According to aspects of the present invention, by allowing the active clamping circuit to perform a clamping operation in a normal operating mode, it is possible to suppress a voltage stress of a main switching device, reduce switching loss, reuse energy, and thereby improve power conversion efficiency. Also, in a standby mode, by reducing power loss of a transformer, etc., which is caused by a current flowing through the primary circuit, and allowing the switch mode power supply apparatus to operate in a discontinuous conduction mode (DCM), it is possible to significantly reduce power consumption of the switch mode power supply apparatus and thereby improve power consumption efficiency in the standby mode.

As described above, according to aspects of the present invention, by disabling the clamping operation of an active clamping circuit when a switch mode power supply apparatus is in a standby mode, it is possible to significantly reduce power consumption in the standby mode and thereby improve efficiency of the switch mode power supply apparatus.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A switch mode power supply apparatus, comprising:
   a transformer having a primary coil connected to a source and a secondary coil connected to an output circuit;
   a main switching device to adjust a power supply supplied from the source to the primary coil of the transformer;
   an active clamping circuit comprising a first switching device and a clamping capacitor to perform a clamping operation which suppresses a voltage stress of the main switching device and a second switching device to allow a first control signal to be applied to the first switching device selectively; and
   a control circuit to apply a second control signal to the second switching device to allow the first control signal to be applied to the first switching device when the switch mode power supply apparatus is in a normal operating mode and cut off the first control signal when the switch mode power supply apparatus is in a standby mode,
   wherein the first control signal allows the active clamping circuit to perform the clamping operation by controlling the first switching device,
   wherein the first control signal controls the first switching device to be operated complementary to the main switching device, and
   wherein the second switching device is connected and disconnected to a control terminal of the first switching device from a pulse width modulation controller.

2. The switch mode power supply apparatus of claim 1, wherein the first switching device is a Metal Oxide Semiconductor Field Effect Transistor (MOSFET), and the first control signal is input to a gate of the MOSFET device to control a switching operation of the first switching device to perform the clamping operation, and
   the second switching device is connected to the gate of the MOSFET device, and the control circuit applies the second control signal to disable the clamping operation by turning off the second switching device in the standby mode.

3. The switch mode power supply apparatus of claim 2, wherein the active clamping circuit comprises an auxiliary coil coupled to the primary coil of the transformer, and the auxiliary coil generates the first control signal applied to the gate of the MOSFET device.

4. The switch mode power supply apparatus of claim 3, wherein the active clamping circuit further comprises a dead-time control circuit connected to the gate of the MOSFET device.

5. The switch mode power supply apparatus of claim 2, further comprising a Pulse Width Modulation (PWM) control unit to generate a main control signal to control a switch operation of the main switching device and to generate the first control signal applied to the gate of the MOSFET device.

6. The switch mode power supply apparatus of claim 5, wherein the active clamping circuit further comprises a pulse transformer disposed between the PWM controller and the gate of the MOSFET device.

7. The switch mode power supply apparatus of claim 5, wherein the active clamping circuit further comprises a bootstrap circuit connected to the gate of the MOSFET device.

8. The switch mode power supply apparatus of claim 5, wherein the PWM controller is connected to the gate of the MOSFET device through the second switching device.

9. The switch mode power supply apparatus of claim 1, wherein the control circuit generates a control signal to disable the clamping operation of the active clamping circuit according to an output voltage of the output circuit connected to the secondary coil of the transformer.

10. The switch mode power supply apparatus of claim 9, wherein the control circuit compares the output voltage with a predetermined reference voltage and generates the control signal to disable the clamping operation of the active clamping circuit according to the comparison result.

11. The switch mode power supply apparatus of claim 1, wherein the control circuit compares a voltage across a resistor connected to the switching device with a predetermined reference voltage to determine the current flowing through the main switching device.

12. The switch mode power supply apparatus of claim 1, wherein the control circuit generates a control signal to disable the operation of the active clamping circuit according to a signal generated by an external device installed outside the switch mode power supply apparatus, the external device indicating whether the switch mode power supply apparatus is in the standby mode.

13. The switch mode power supply apparatus of claim 1, wherein the output circuit comprises a rectifier.

14. The switch mode power supply apparatus of claim 1, wherein the control circuit generates the second control signal to disable the clamping operation of the active clamping circuit according to a current flowing through the main switching device.

15. A switch mode power supply apparatus, comprising:
an output circuit to provide an output power to a drain;
voltage input terminals through which power is supplied to the apparatus;
a transformer having a primary coil and a secondary coil;
an active clamping circuit connected between the voltage input terminals and the primary coil of the transformer;
a rectifier disposed between the secondary coil of the transformer and the output circuit;
a Pulse Width Modulation (PWM) controller;
a control circuit to control the active clamping circuit;
a main switching device to control application of the power from the source to the active clamping circuit, the main switching device being controlled by a main control signal received from the PWM controller,
wherein the active clamping circuit comprises:
a clamping capacitor;
a first switching device connected between the main switching device and the clamping capacitor; and
a second switching device to allow a first control signal to be applied to the first switching device selectively, and
wherein the control circuit applies a second control signal to the second switching device to allow the first control signal to be applied to the first switching device when the switch mode power supply apparatus is in a normal operating mode and cut off the first control signal when the switch mode power supply apparatus is in a standby mode,
wherein the first control signal allows the active clamping circuit to perform the clamping operation by controlling the first switching device,
wherein the first control signal controls the first switching device to be operated complementary to the main switching device, and
wherein the second switching device is connected and disconnected to a control terminal of the first switching device from the PWM controller.

16. The apparatus of claim 15, wherein the first switching device is a Metal Oxide Semiconductor Field Effect Transistor (MOSFET), the second switching device is connected to a gate of the first switching device to control the application of the first control signal to the gate of the first switching device, and the control circuit applies the second control signal to the second switching device to selectively apply the first control signal to the gate of the first switching device.

17. The apparatus of claim 16, wherein the second switching device is connected to the PWM controller between the PWM controller and the gate of the first switching device.

18. The apparatus of claim 17, wherein the PWM controller generates the first control signal applied to the gate of the first switching device.

19. The apparatus of claim 16, wherein the control circuit applies the second control signal to the second switching device according to an output voltage of the output circuit.

20. The apparatus of claim 19, wherein the control circuit applies the second control signal to the second switching device when the output voltage of the output circuit exceeds a predetermined value.

21. The apparatus of claim 19, wherein the control circuit comprises a photodiode, and the second switching device comprises a phototransistor.

22. The apparatus of claim 15, further comprising:
an output voltage feedback circuit to feedback information about an output voltage of the output circuit to the PWM controller.

* * * * *